Figure 1:
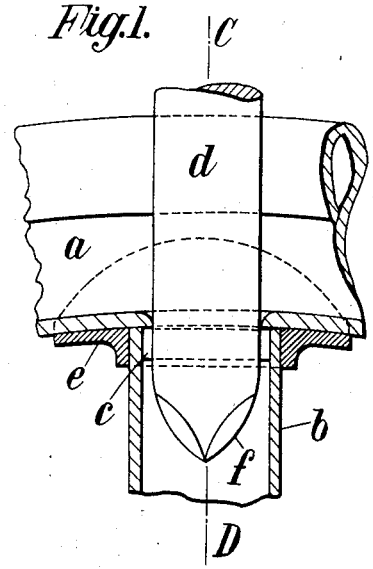

Jan. 22, 1929.  1,700,072

A. E. OWEN ET AL

MANUFACTURE OF VEHICLE WHEELS

Filed May 9, 1928

INVENTORS
A.E.Owen
R.W.Downs
BY
ATTORNEYS

Patented Jan. 22, 1929.

1,700,072

UNITED STATES PATENT OFFICE.

ALFRED ERNEST OWEN AND ROBERT WILFORD DOWNS, OF DARLASTON, ENGLAND.

MANUFACTURE OF VEHICLE WHEELS.

Application filed May 9, 1928, Serial No. 276,428, and in Great Britain February 24, 1927.

This invention relates to the manufacture of vehicle wheels and has for its object to provide an improved method of securing the several ends of the spokes to the rim whereby economy in manufacture is obtained without impairing the strength or affecting the appearance of the finished wheel.

The present method relates particularly to that described in the specification filed with our application for patent of the United States of America Serial No. 147,545, filed November 10th, 1926, of reinforcing the outer ends of the spokes by means of ferrules and pressing or swaging the portions of the rim coincident with and adjacent to the said outer ends of the spokes into the interior of the spokes, the portions of the rim thus pressed into the spokes forming spigots that firmly hold the several spokes in position adjacent to the rim.

According to the improved method forming the subject matter of this invention, which is applicable to the construction of any type of wheel wherein tubular spokes are to be secured to any form of rim, the several spokes are secured to the rim by means of split spigots pressed out of the material of the rim into the outer ends of the spokes, a pressing or swaging tool or punch being employed of such formation that the turned-in portion or spigot is split or divided within the end of the spoke, the split spigot is then welded to the interior of the spoke and a ferrule drawn over the end of the spoke to cover up the joint between the spoke and the rim and the space which may be present between the end of the spoke and the rim due to the curve of the rim. The said ferrule is shaped to conform to the inner peripheral surface of the rim to which it is attached by riveting or any known method of welding.

In order that the method employed in accordance with our invention may be clearly understood and readily carried out reference may now be made to the accompanying drawings in which similar reference characters relate to corresponding parts in all the figures.

Figure 2:
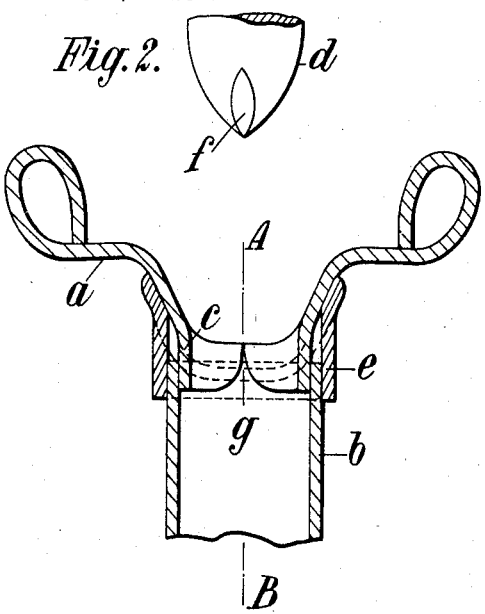

In the said drawings, Figure 1 is a sectional elevation on the line A—B Figure 2 and Figure 2 a similar view on the line C—D Figure 1, showing the split spigot being pressed out of the rim into the outer end of a spoke by means of a pressing tool or punch shown at the completion of its operative stroke in Figure 1 and retracted in Figure 2.

Figure 3:
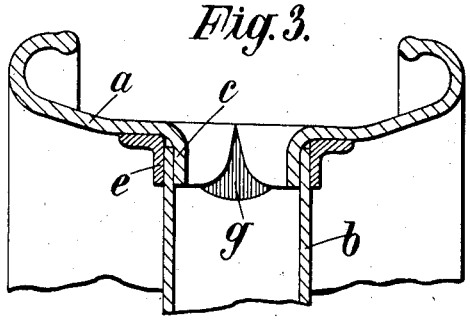
Figure 4:
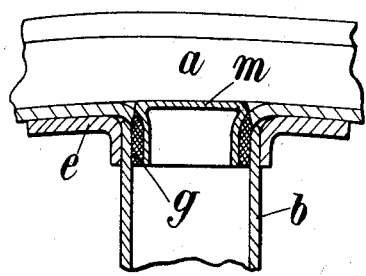
Figure 5:
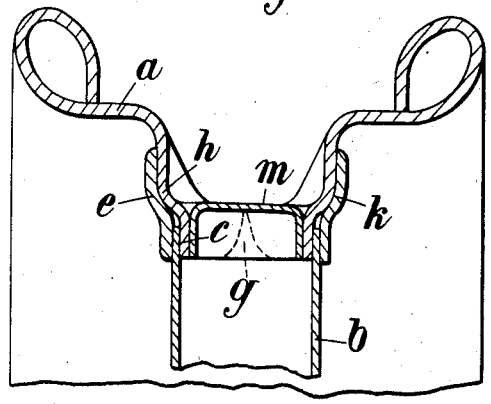

Figures 3 and 4 are similar views after the operation is completed and the split spigot has been welded to the spoke and Figure 5 shows the method applied to a rim provided with projections engaging similarly formed indentations on the ferrules.

Referring to the drawings in which $a$ represents the wheel rim, $b$ one of the hollow spokes, $c$ a spigot pressed out of the material of the rim $a$ into the outer end of the spoke $b$ by means of the pressing tool or punch $d$ and $e$ one of the aforesaid ferrules, it will be seen that the nose of the punch $d$ is ground so that two or more cutting edges $f$ are formed thereon that, when the punch $d$ is forced through the rim $a$ (Figures 1 and 2), split the spigot $c$ leaving definite gaps $g$. The split spigot $c$ is then welded, preferably electrically, to the inside of the spoke for the full length of the gaps $g$ (Figures 3 and 4) and the ferrule $e$ is then drawn over the joint of the spoke $b$ and the rim $a$ is described above and is secured to the rim $a$. The thimbles $m$ fill the holes in the rim $a$ formed by the punch $d$.

As shown in Figure 5 this method can be employed in conjunction with the protrusions or projections $h$ formed on the rim $a$ and engaging with similarly formed seatings or indentations $k$ on the ferrules $e$ as described in the specification of our patent application Serial No. 147,545 previously referred to and by its employment the costly operations of "cleaning up" by grinding or filing, necessary when the rim and spokes are joined by welding outside the spokes, is avoided without detracting from the appearance of the finished wheel.

What we claim is:—

In the manufacture of vehicle wheels, pressing or swaging the material of the rim coincident with or adjacent to the outer end of each of the several spokes into the interior thereof in such a manner that the operation of pressing or swaging causes the splitting within the spokes of the portions or spigots so pressed out, then welding the split spigots to the inside of the spokes and applying ferrules to the outer ends of the spokes and securing same to the rim substantially as described.

In testimony whereof we affix our signatures.

ALFRED ERNEST OWEN.
ROBERT WILFORD DOWNS.